United States Patent
Abe et al.

(10) Patent No.: US 7,610,119 B2
(45) Date of Patent: Oct. 27, 2009

(54) SAFETY CONTROLLER AND SYSTEM USING SAME

(75) Inventors: Yuichi Abe, Okayama (JP); Teruyuki Nakayama, Okayama (JP); Yuji Hashimoto, Kyoto (JP); Minoru Hashimoto, Okayama (JP); Takahiro Ide, Kishima-gun (JP)

(73) Assignee: OMRON Corporation, Kyoto (JP)

( * ) Notice: Subject to any disclaimer, the term of this patent is extended or adjusted under 35 U.S.C. 154(b) by 754 days.

(21) Appl. No.: 10/879,295

(22) Filed: Jun. 28, 2004

(65) Prior Publication Data
US 2005/0010332 A1 Jan. 13, 2005

(30) Foreign Application Priority Data
Jul. 8, 2003 (JP) ............................ 2003-193359
Nov. 25, 2003 (JP) ............................ 2003-394386

(51) Int. Cl.
*G05D 1/00* (2006.01)
*H01H 19/64* (2006.01)

(52) U.S. Cl. ................ 701/1; 307/113; 307/132 E; 307/141.4; 307/143; 307/31

(58) Field of Classification Search ........... 307/113, 307/132 E, 141.4, 143, 31; 327/355; 335/206, 335/63, 87; 361/1, 600
See application file for complete search history.

(56) References Cited

U.S. PATENT DOCUMENTS

| | | | | |
|---|---|---|---|---|
| 4,500,951 A | | 2/1985 | Sugimoto et al. | |
| 4,853,831 A | * | 8/1989 | Tsuchiya | 361/679.32 |
| 4,862,451 A | * | 8/1989 | Closs et al. | 370/353 |
| 4,882,702 A | * | 11/1989 | Struger et al. | 710/2 |
| 5,038,317 A | * | 8/1991 | Callan et al. | 710/301 |
| 5,519,636 A | * | 5/1996 | Stoll et al. | 700/282 |
| 5,818,123 A | * | 10/1998 | Iwasaki et al. | 307/42 |
| 5,841,257 A | * | 11/1998 | Hashimoto et al. | 318/568.11 |

(Continued)

FOREIGN PATENT DOCUMENTS

EP    1396772    10/2004

(Continued)

OTHER PUBLICATIONS

JP patent application No. 2003-394386, Examination Report dated May 20, 2008.

(Continued)

*Primary Examiner*—Khoi Tran
*Assistant Examiner*—Nicholas Kiswanto
(74) *Attorney, Agent, or Firm*—Weaver Austin Villeneuve & Sampson LLP

(57) ABSTRACT

A safety controller provides a safety output to a target controlled system such as a magnet contactor based on an input from an input device such as a safety door switch to thereby control operation of machine equipment. Safety output parts serve to transmit a solid-state output as the safety output and a connection output part transmits a connection output to another safety controller. A control part having two CPUs controls the safety output and the connection output according to a program based on the input from the input device. Two or more of such safety controllers are connected through their connecting output parts and the connecting input parts to together form a safety system.

20 Claims, 14 Drawing Sheets

U.S. PATENT DOCUMENTS

| | | | | |
|---|---|---|---|---|
| 5,845,149 | A * | 12/1998 | Husted et al. | 710/9 |
| 6,061,261 | A * | 5/2000 | Chen et al. | 363/146 |
| 6,147,419 | A * | 11/2000 | Girard | 307/116 |
| 6,175,780 | B1 * | 1/2001 | Engel | 700/293 |
| 6,246,318 | B1 * | 6/2001 | Veil et al. | 340/458 |
| 6,301,509 | B1 * | 10/2001 | Obata | 700/11 |
| 6,385,562 | B1 * | 5/2002 | Roth et al. | 702/188 |
| 6,401,011 | B1 * | 6/2002 | Hashimukai | 700/248 |
| 6,424,258 | B1 | 7/2002 | Claes | |
| 6,532,508 | B2 * | 3/2003 | Heckel et al. | 710/110 |
| 6,628,015 | B2 * | 9/2003 | Pullmann et al. | 307/326 |
| 6,759,767 | B2 * | 7/2004 | Maskovyak et al. | 307/117 |
| 6,778,080 | B2 * | 8/2004 | Veil et al. | 340/506 |
| 6,787,940 | B2 * | 9/2004 | Pullmann | 307/326 |
| 6,812,596 | B2 * | 11/2004 | Veil | 307/326 |
| 6,825,579 | B2 * | 11/2004 | Ehrlich et al. | 307/113 |
| 6,871,240 | B2 * | 3/2005 | Rupp et al. | 710/8 |
| 6,992,458 | B2 * | 1/2006 | Hashimoto et al. | 318/568.13 |
| 7,076,311 | B2 * | 7/2006 | Schuster | 700/21 |
| 7,116,069 | B1 * | 10/2006 | Holterman et al. | 318/400.21 |
| 7,130,171 | B2 * | 10/2006 | Pullmann et al. | 361/62 |
| 7,239,048 | B2 * | 7/2007 | Ehrlich et al. | 307/326 |
| 2002/0005669 | A1 * | 1/2002 | Tanguay | 307/141.4 |
| 2002/0126620 | A1 * | 9/2002 | Heckel et al. | 370/216 |
| 2003/0011250 | A1 * | 1/2003 | Pullmann et al. | 307/326 |
| 2003/0151312 | A1 * | 8/2003 | Maskovyak et al. | 307/117 |
| 2004/0010326 | A1 * | 1/2004 | Schuster | 700/79 |
| 2004/0206613 | A1 * | 10/2004 | Ward | 200/51.09 |
| 2004/0210326 | A1 * | 10/2004 | Muneta et al. | 700/82 |
| 2004/0215354 | A1 * | 10/2004 | Nakamura et al. | 700/21 |

FOREIGN PATENT DOCUMENTS

| | | |
|---|---|---|
| JP | 01-180005 | 7/1989 |
| JP | 06-289926 | 10/1994 |
| JP | 07-143626 | 6/1995 |
| JP | 09-297605 | 11/1997 |
| JP | 10/207511 | 8/1998 |
| JP | 2001-521669 | 11/2001 |
| JP | 2002-041103 | 2/2002 |
| JP | 2002-169602 | 6/2002 |
| JP | 2002-358106 | 12/2002 |
| JP | 2003-015710 | 1/2003 |
| JP | 2003-140702 | 5/2003 |
| JP | 2003-218317 | 7/2003 |
| JP | 2003-528495 | 9/2003 |
| JP | 2003-532181 | 10/2003 |

OTHER PUBLICATIONS

European patent application No. 04015909.7-2206, European Search Report dated Jul. 3, 2006.

* cited by examiner

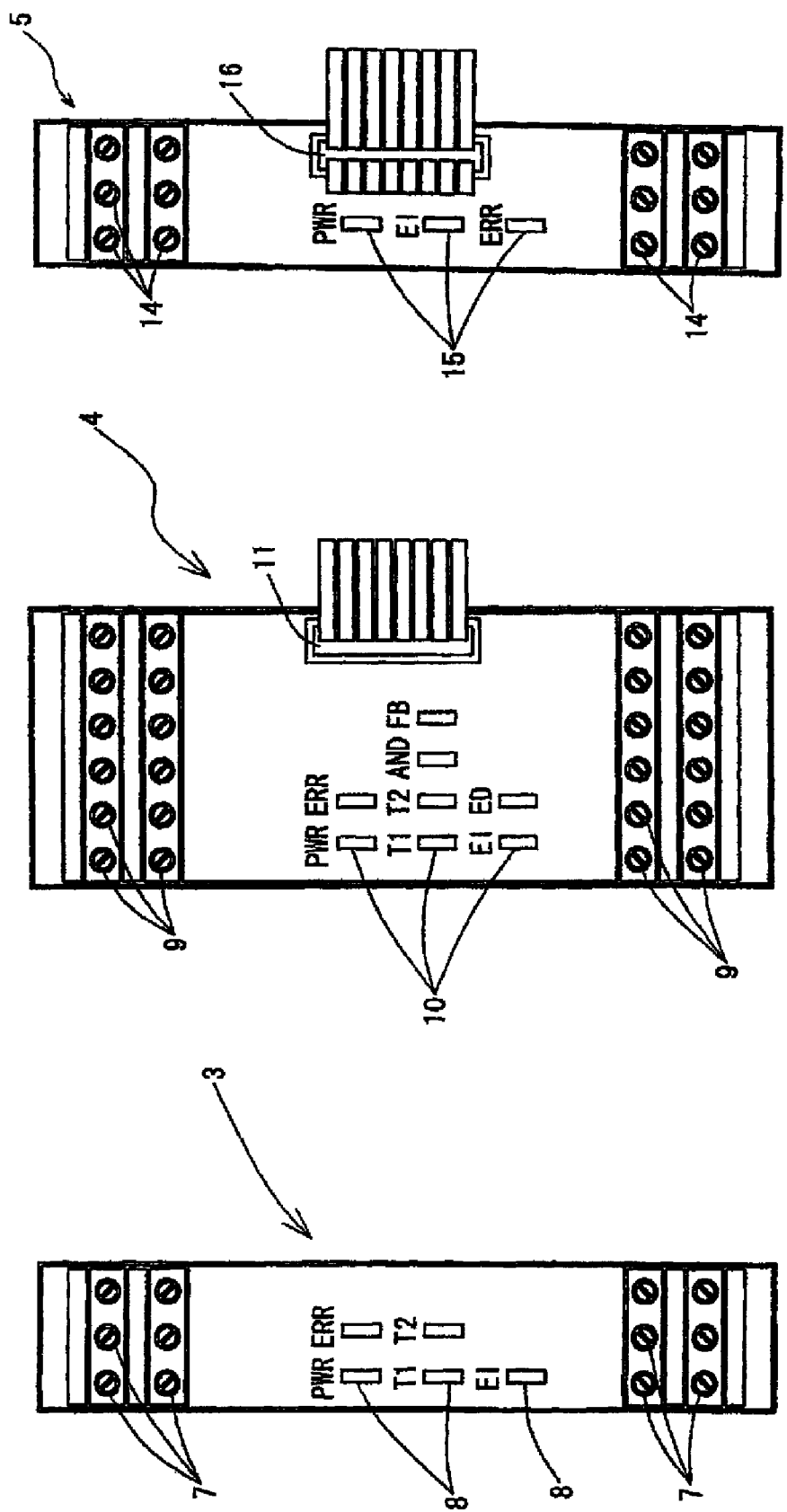

(a) SAFETY INPUT 1
(b) SAFETY INPUT 2
(c) RESET INPUT
(d) SAFETY (INST.) OUTPUT
(e) SAFETY (OFF-DELAY) OUTPUT (a) SAFETY INPUT 1
(b) SAFETY INPUT 2
(c) RESET INPUT
(d) SAFETY OUTPUT
(e) SAFETY OUTPUT (EXPANSION UNIT)

(a) SAFETY INPUT 1
(b) SAFETY INPUT 2
(c) RESET INPUT
(d) SAFETY OUTPUT
(e) INNER SAFETY OUTPUT
(f) INNER SAFETY INPUT
(g) SAFETY INPUT 3
(h) SAFETY INPUT 4
(i) RESET INPUT
(j) SAFETY OUTPUT (INST.)
(k) SAFETY OUTPUT (OFF-DELAY)
(l) SAFETY OUTPUT (OFF-DELAY)

(a) SAFETY INPUT 5
(b) SAFETY INPUT 6
(c) RESET INPUT
(d) INNER SAFETY OUTPUT (e) INNER SAFETY INPUT
(f) SAFETY INPUT 1
(g) SAFETY INPUT 2
(h) SAFETY OUTPUT (INST.)
(i) SAFETY OUTPUT (OFF-DELAY)

(j) INNER SAFETY INPUT
(k) SAFETY INPUT 3
(l) SAFETY INPUT 4
(m) SAFETY OUTPUT (INST.)
(n) SAFETY OUTPUT (OFF-DELAY)

SAFETY CONTROLLER AND SYSTEM USING SAME

Priority is claimed on Japanese Patent Applications 2003-193359 filed Jul. 8, 2003 and 2003-394386 filed Nov. 25, 2003.

BACKGROUND OF THE INVENTION

This invention relates to a safety controller and a system using such a safety controller. In particular, this invention relates to a safety controller of the kind suitable for a safety circuit for a machine equipment such as fabrication machines and industrial robots and a system using such a safety controller.

Japanese Patent Publication Tokkai 2003-14072, for example, disclosed a safety circuit using a relay unit containing a plurality of electromagnetic relays for securing labor safety at a production site, adapted to supply electric power to a machine equipment such as fabrication machines and industrial robots only when their safe condition is assured. Such a relay unit serves to monitor the condition of a safety circuit on the basis of an input signal from a safety switch such as an emergency stop switch or a safety area sensor such as a safety door switch and to shut off the power source of such a machine equipment dependably if an abnormal condition has occurred and not to restart the machine equipment unless the cause of the abnormal condition has been removed.

In a system using a relay unit containing such electromagnetic relays, a logic is formed by wiring because the safety circuit is formed by the relay sequence and if there are many fabrication machines or the like to be controlled, the number of wires increases, the system becomes complicated and it becomes difficult to design such a system.

When it becomes desirable to modify a portion of a system in response to the user's request, such as when it becomes desirable, say, on a production line having a plurality of fabrication machines distributed at different work areas, to control the starting and stopping of a fabrication machine at a certain work area in correlation with another fabrication machine at a neighboring work area, its logic must be changed by the wiring and hence this requires a long time and a large amount of manpower.

SUMMARY OF THE INVENTION

It is therefore an object of this invention in view of the above to provide a safety controller with reduced wiring but still capable of forming a system easily, as well as a system using such an improved safety controller.

A safety controller according to this invention is for providing a safety output to a target controlled system based on an input from an input device to thereby control operation of machine equipment and may be characterized as comprising a plurality of safety output parts for transmitting a solid-state output as the safety output, a connection output part for transmitting a connection output to another safety controller, and a control part for controlling the safety output and the connection output according to a program based on the input from the input device. In the above, the input device means any device adapted to provide an input signal to this safety controller and may include emergency stop switches, safety door switches, safety limit switches and safety light curtains. The target controlled system means any system adapted to be controlled by a safety output outputted from this safety controller and may include magnet contactors, motor controllers, variable motors and PLCs. Examples of the machine equipment include fabrication machines of all sorts as well as industrial robots and examples of their control include startup and stopping operations as well as control on their motion and speed. The connection output means any signal used for connecting one safety controller with another safety controller.

With a safety controller structured as above, the number of wirings can be reduced unlike relay units of a conventional kind including electromagnetic relays because it is not necessary to build a safety circuit by way of a relay sequence. Moreover, a portion of the system can be easily modified in response to a user's request by way of a software change. By using the connection output, furthermore, correlation between two safety controllers can be easily established.

According to an embodiment of the invention, the safety controller further comprises a connection input part for receiving a connection output from another safety controller as an connection input and the control part controls the safety output and the connection output based on an input from the input device and connection input from the connection input part. With this embodiment, the output conditions of the safety output and connection output can be correlated with a connection input provided from another safety controller.

According to a preferred embodiment of the invention, the aforementioned connection output is a solid-state output for logical connection. In the above, logical connection means a connection to another safety controller with correlation established, say, by logic such as logical product and logical sum. With this embodiment, safety outputs and connection outputs of one safety controller and another safety controller can be correlated by logic such as logical product and logical sum.

According to another embodiment of the invention, the control part controls the safety output and the connection output by carrying out logical calculations according to the program based on the input from the input device and the connection input from the connection input part. With this embodiment, the result of a logical calculation such as a logical product between the input from the input device and the connection input from the connection input part may be used as the safety output or the connection output. Thus, it is possible to set the output condition of the safety output of the safety controller on the safe side only if the input from the input device is on the safe side allowing operation of the machine equipment and the condition of the connection input from another safety controller is also on the safe side.

According to still another embodiment of this invention, the control part controls output condition of the connection output according to the program in the same way as the output condition of the safety output. In the above, the output condition means either the safe condition (on the safe side) in which operations of the machine equipment are permitted or the danger condition (on the danger side) in which operations of the machine equipment are forbidden. Since the output condition is the same according to this embodiment between the connection output and the safety output, the other safety controller to which the connection output of the first safety controller is provided can correlate its safety output with that of the first safety controller through a logical calculation.

A safety controller of this invention may also be characterized not only as being for providing a safety output to a target controlled system based on an input from an input device to thereby control operation of machine equipment but also as comprising a plurality of safety output parts for transmitting a solid-state output as the safety output, a connection output part for transmitting a connection output to another safety controller, and a control part for carrying out input process, diagnostic process and output process according to a program wherein this control part judges condition of input from the input device in the input process, carries out self-diagnosis in the diagnostic process and controls the safety output and the connection output based on results of the input process and the diagnostic process. In the above, the self-diagnosis is for determining the presence or absence of an abnormal condition such as an operational abnormality in the internal circuit, erroneous wiring to an input device and faulty connection to a terminal.

According to another embodiment, a connection input part is further provided for receiving a connection output from another safety controller as a connection input and the control part judges conditions of input from the input device and of connection input from the connection input part in the input process, carries out self-diagnosis in the diagnostic process and controls the safety output and the connection output based on results of the input process and the diagnostic process. With the control part thus adapted to judge conditions of input from the input device and of connection input from the connection input part in the input process, to carry out self-diagnosis in the diagnostic process and to control the safety output and the connection output based on results of the input process and the diagnostic process, the number of wirings can be reduced because it is not necessary to build a safety circuit by way of a relay sequence. Moreover, a portion of the system can be easily modified in response to a user's request by way of a software change. By using the connection output, furthermore, correlation between two safety controllers can be easily established.

According to a preferred embodiment of the invention, the aforementioned connection output is a solid-state output for logical connection and the control part determines output conditions of the safety output and the connection output by a logical calculation on the input from the input device and the connection input from the connection input part in the input process and controls in the output process according to the result of the diagnostic process the safety output and the connection output in a safe condition determined by the input process if there is no abnormality and in a predetermined output condition if there is an abnormality. In the above, the predetermined output condition means a danger condition in which the operations of the machine equipment are forbidden.

In the above, it is preferable to control the output conditions of the safety output and the connection output to be in the same condition.

According to this preferred embodiment, it is possible to correlate the safety output and the connection output of a safety controller and another safety controller by logic such as a logical product or a logical sum. Safety can be dependably assured since the control is made to the danger side to forbid the operations of machine equipment when an abnormality is found as a result of the diagnostic process.

According to another embodiment of the invention, a setting part may be further provided for setting to enable/disable the connection input from the connection input part and the control part controls the safety output and the connection output by disabling the connecting input if the setting part sets for disablement. The setting by the setting part may be effected, for example, by operating a setting switch or by communication. By this embodiment, the choice between enabling and disabling the connection input can be made easily without varying the wiring among a plurality of safety controllers.

According to a preferred embodiment of the invention, the safety output parts include both an instantaneous output part for outputting safety instantaneous outputs and an off-delay output part for outputting safety off-delay outputs. A safety controller according to this embodiment is convenient for controlling a machine equipment having both input devices such as emergency stop switches which should be stopped immediately by shutting off powder and those desired to be stopped after a specified delay because both kinds of safety output can be outputted.

According to a different embodiment of the invention, the safety output and the connection output have different signal patterns. With a safety controller according to this embodiment, the signal pattern of the connection output alone may be changed according to the kind of logic such as the logical product, logical sum and exclusive logical sum.

According to still another embodiment of the invention, an expansion unit that contains a plurality of electromagnetic relays and is adapted to output a relay output corresponding to the safety output is made connectable. By making such an expansion unit connectable, it is easily possible to increase the number of outputs.

According to a further embodiment of the invention, the control part comprises two CPUs. The level of safety can be augmented by having the same process carried out by these two CPUs.

A system according to this invention is characterized as comprising a plurality of safety controllers according to this invention connected together through the connecting output parts and through the connecting input parts. With a system thus structured, safety circuits need not be formed by relay sequence unlike with a relay unit of a prior art type comprised of electromagnetic relays. Thus, the wiring can be simplified and the maker can easily change a portion of the system through software in response to a request by the user. A system of this invention can also be expanded easily by correlating additional safety controllers through logic such as logical product or logical sum by using their connection outputs.

BRIEF DESCRIPTION OF THE DRAWINGS

FIG. 2 is a front view of the basic unit of FIG. 1.
FIG. 3 is a front view of an advanced unit of FIG. 1.
FIG. 5 is a front view of an expansion unit of FIG. 1.

DETAILED DESCRIPTION OF THE INVENTION

Figure 1:
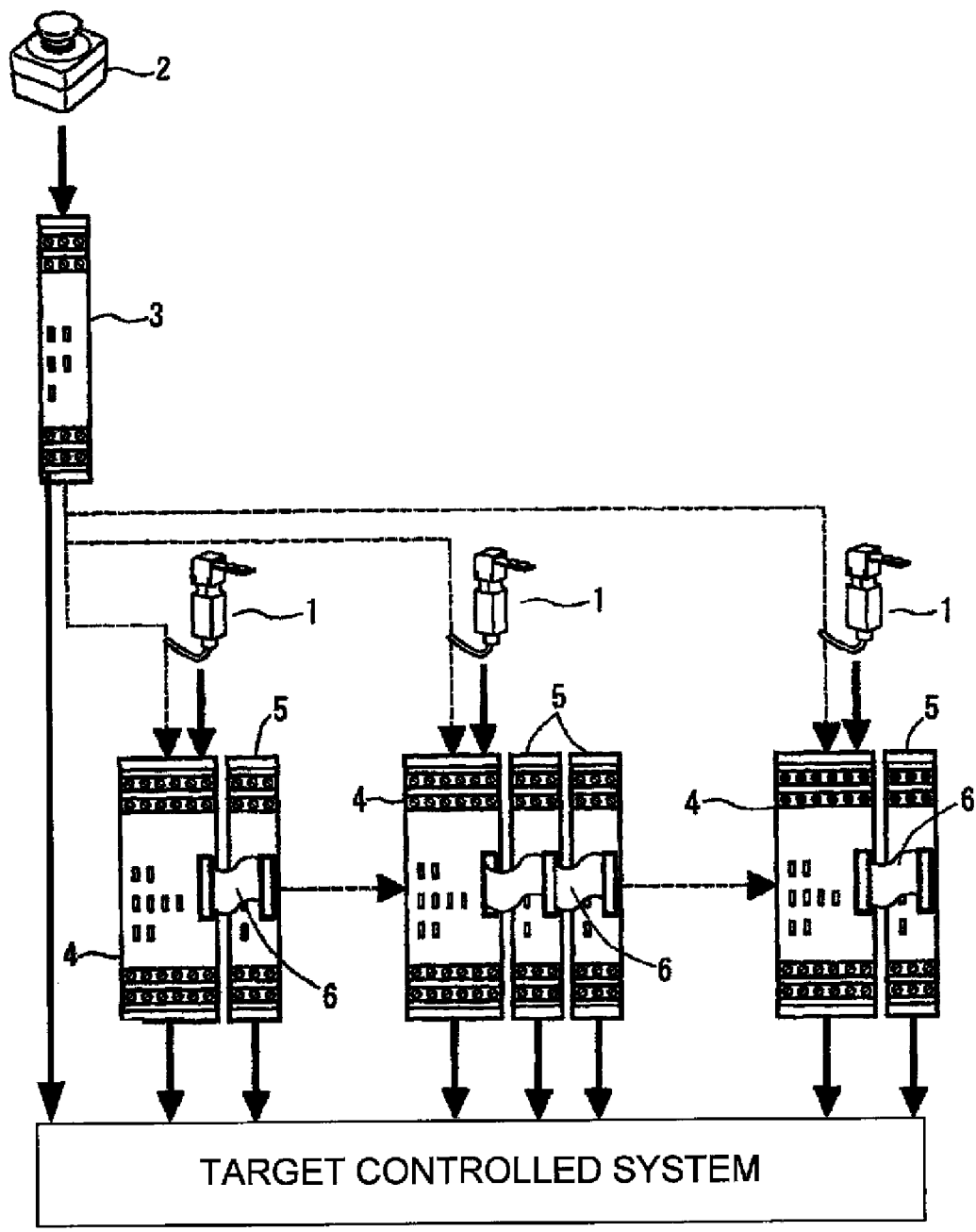
FIG. 1 shows a system embodying this invention.

The invention is described next in detail with reference to drawings. FIG. 1 shows the structure of an example of a system using safety controllers embodying this invention. The safety controllers according to this embodiment are a safety circuit for supplying electric power to a machine equipment such as fabrication machines or industrial robots (not shown) only when safety is assured. There are three kinds of safety controllers shown in this example, a basic unit 3 connected to an input device such as an emergency stop switch 2, advanced units 4 each connected to the basic unit 3 and also to an input device such as a safety door switch 1, and expansion units 5 each connected to one of these advanced units 4 through a cable 6.

The basic unit 3 serves not only to receive inputs from input devices such as the emergency stop switch 2 but also to output safety output signals to a magnet contactor or the like as a target of control by supplying and shutting off power to a motor for driving a fabrication machine or the like, as well as inner safety output signals as a logical connection output to an advanced unit 4. In the above, the logical connection output means an output for logically connecting the basic unit 3 which outputs this logical connection output and the advanced unit 4 to which it is given.

In this example, the safety output and the logical connection output outputted from the basic unit 3 are in the same output condition, that is, if the safety output is in the safe output condition allowing the operations of machine equipment, the logical connection output is also in the safe output condition. Likewise, if the safety output is in the danger output condition forbidding the operations of machine equipment, the logical connection output is also in the danger output condition. Thus, the logical connection output which is in the same output condition is referred to as the inner safety output in contrast to the original safety output to a target of control such as a magnet contactor.

Each advanced unit 4 serves not only to receive inputs from input devices such as the safety door switch 1 and the emergency stop switch 2 as well as inner safety outputs outputted from the basic units 3 and the advanced units 4 on the upstream side as inner safety inputs but also to output safety outputs to magnet contactors, etc. for carrying out and shutting off the supply of power to motors for driving fabrication machines, etc. and logical connection outputs to the advanced units 4 on the downstream side.

The inner safety outputs, which are logical connection outputs outputted from the advanced units 4, are outputs for the logical connection between an advanced unit 4 on the upstream side with another advanced unit 4 on the downstream side.

The output condition is the same between the safety output outputted from an advanced unit 4 to a target of control and the inner safety output. As will be explained below, an advanced unit 4 is capable of outputting both a safety instantaneous output and a safety off-delay output, and the output condition is the same between the inner safety output and the safety instantaneous output.

In FIG. 1, it is to be noted that the inner safety outputs from the basic unit 3 to the advanced units 4 and those from any advanced unit 4 on the upstream side to another advanced unit 4 on the downstream side are each indicated by a broken arrow line.

The expansion units 5 are each connected through a cable 6 to a corresponding one of the advanced units 4 and serve to output a safety output in synchronism with the advanced unit 4 to a magnet contactor, etc. as a target of control serving to supply and shut off the supply of power for driving fabrication machines, etc.

The basic unit 3 includes a CPU serving as its control unit as will be explained below, being adapted to receive two safety inputs and outputs two safety instantaneous outputs which are solid-state outputs (transistor outputs) and two inner safety outputs. For the purpose of doubling according to a safety regulation, an input from an emergency stop switch may be provided as the two safety inputs.

The basic unit 3 is also adapted to output a monitor output in synchronism with the safety instantaneous output and an error output at the time of an inner error. It is also adapted to input a feedback/reset input.

As shown in FIG. 2, the basic unit 3 is provided with a plurality of input-output terminals 7 at the top and the bottom and display devices 8 for indicating the conditions of the power source (PWR), an error condition (ERR), the safety inputs 1, 2 (T1, T2) and the safety instantaneous output (E1) each by means of an LED.

The advanced unit 4, like the basic unit 3, is provided with a CPU as its control unit and is adapted not only to input two safety inputs and one inner safety input but also to output three safety instantaneous output which are solid-state outputs (transistor outputs), two safety off-delay outputs and an inner safety output as logical connection output. For the purpose of doubling according to a safety regulation, an input from an emergency stop switch or a safety door switch may be provided as the two safety inputs.

One of the inner safety inputs is from the basic unit 3 or an advanced unit 4 on the upstream side and a logical connection is made to the basic unit 3 or the advanced unit 4 on the upstream side by this inner safety input.

Explained more in detail, according to this example, this inner safety input and the two safety inputs from this associated advanced unit 4 are connected through logical AND such that when the input condition of the inner safety input is on the safe side and the input condition of the two safety inputs are also on the safe side, the safety output in the safe output condition is outputted.

The advanced unit 4 is also adapted to output a monitor output in synchronism with the safety instantaneous output and an error output at the time of an inner error. It is further adapted to input a feedback/reset input.

As shown in FIG. 3, the advanced unit 4 is provided with a plurality of input-output terminals 9 at the top and the bottom and display devices 10 for indicating the conditions of the power source (PWR), an error condition (ERR), the safety inputs 1, 2 (T1, T2), the inner safety input (AND), the feedback input (FB), the safety instantaneous output (EI) and the safety off-delay output (ED) each by means of an LED. The advanced unit 4 is also provided with a connector 11 for connecting five of the expansion units 5 such that up to five expansion units 5 can be connected thereto. It is through this connector 11 that signals such as the safety instantaneous output, the safety off-delay output, feedback input and output from the expansion units 5 and grounding are inputted and outputted.

Figure 4A:
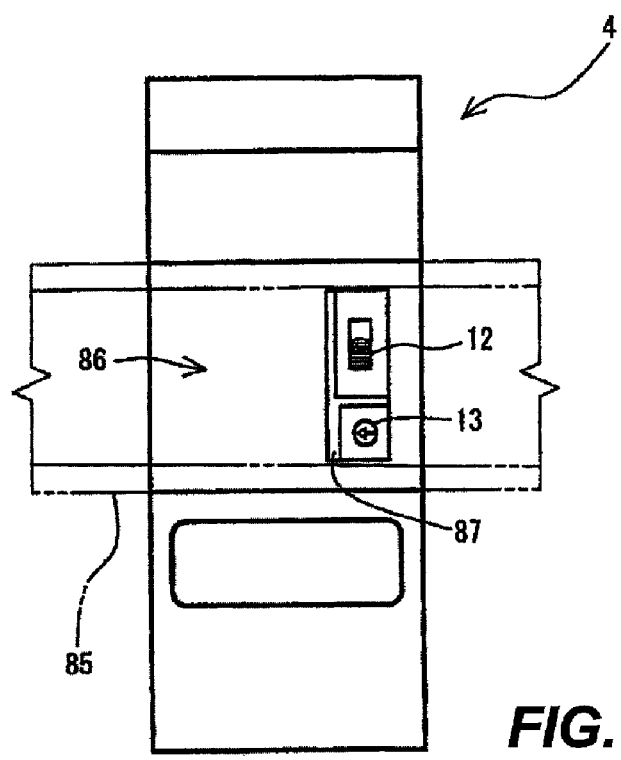
FIGS. 4A and 4B are respectively a back view of the advanced unit and its diagonal view when attached to a DIN rail.
Figure 4B:
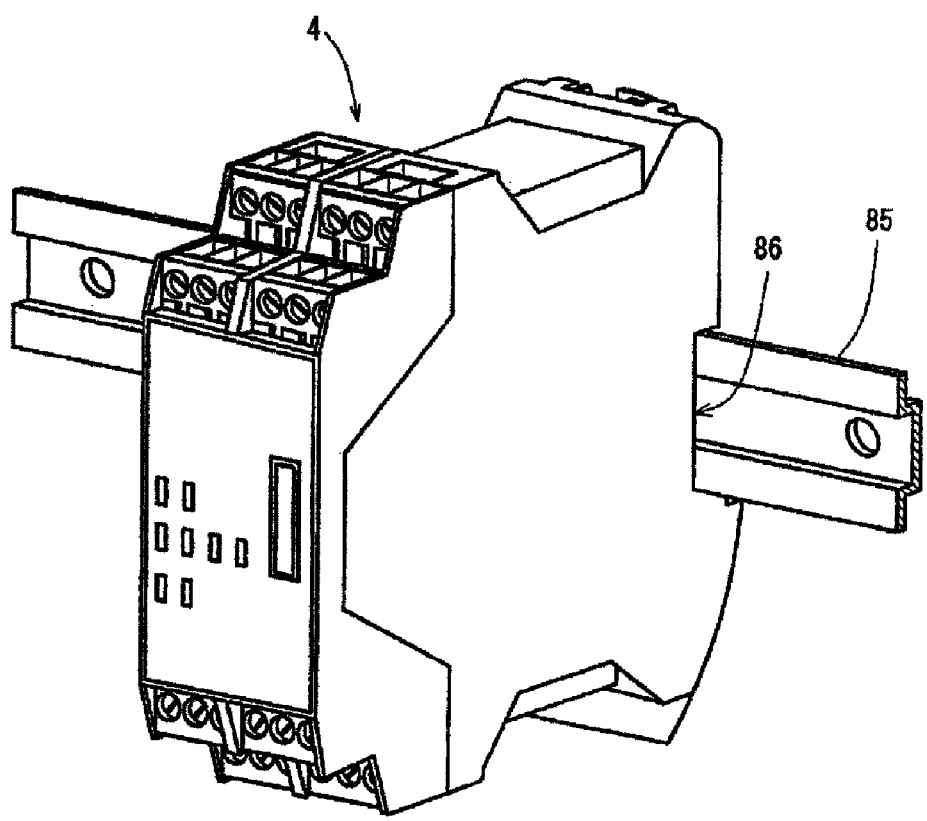

As shown in FIG. 4A, the case for the advanced unit 4 is provided with a groove 86 on the backside for engaging with a supporting rail (DIN rail 85) such that the unit 4 can be supported by the rail 85 as shown in FIG. 4B. The advanced unit 4 is provided with a rectangular opening 87 where the groove 86 is formed as shown in FIG. 4A. A slide switch 12 and a rotary switch 13 are provided so as to be operable through this opening 87 from outside. The slide switch 12 is for setting the inner safety input for the logical connection to be enabled or disabled. The rotary switch 13 is for setting the off-delay time. If the slide switch 12 is set so as to disable the safety input for the logical connection, the inner safety inputs from the other units 3 and 4 are disabled and the logical connections are not effected.

The expansion units 5 are set whenever necessary if the advanced units 4 alone cannot supply enough output points, each containing a plurality of electromagnetic relays. The expansion unit 5 may be of the so-called instantaneous type adapted to output three safety outputs (relay outputs) in synchronism with a safety instantaneous output from the advanced unit 4 or of the so-called off-delay type adapted to output three safety outputs (relay outputs) in synchronism with a safety off-delay output from the advanced unit 4.

As shown in FIG. 5, the expansion unit 5 is provided with a plurality of input-output terminals 14 at the top and the bottom and display devices 15 for indicating the conditions of the power source (PWR), an error condition (ERR), the safety instantaneous output (EI) (which is transmitted immediately in a situation of danger) or the safety off-delay output (ED) (which is transmitted after a predetermined delay in a situation of danger) each by means of an LED. The expansion unit 5 is also provided with a connector 16 for connecting to an advanced unit 4 or another expansion unit 5.

Figure 6:
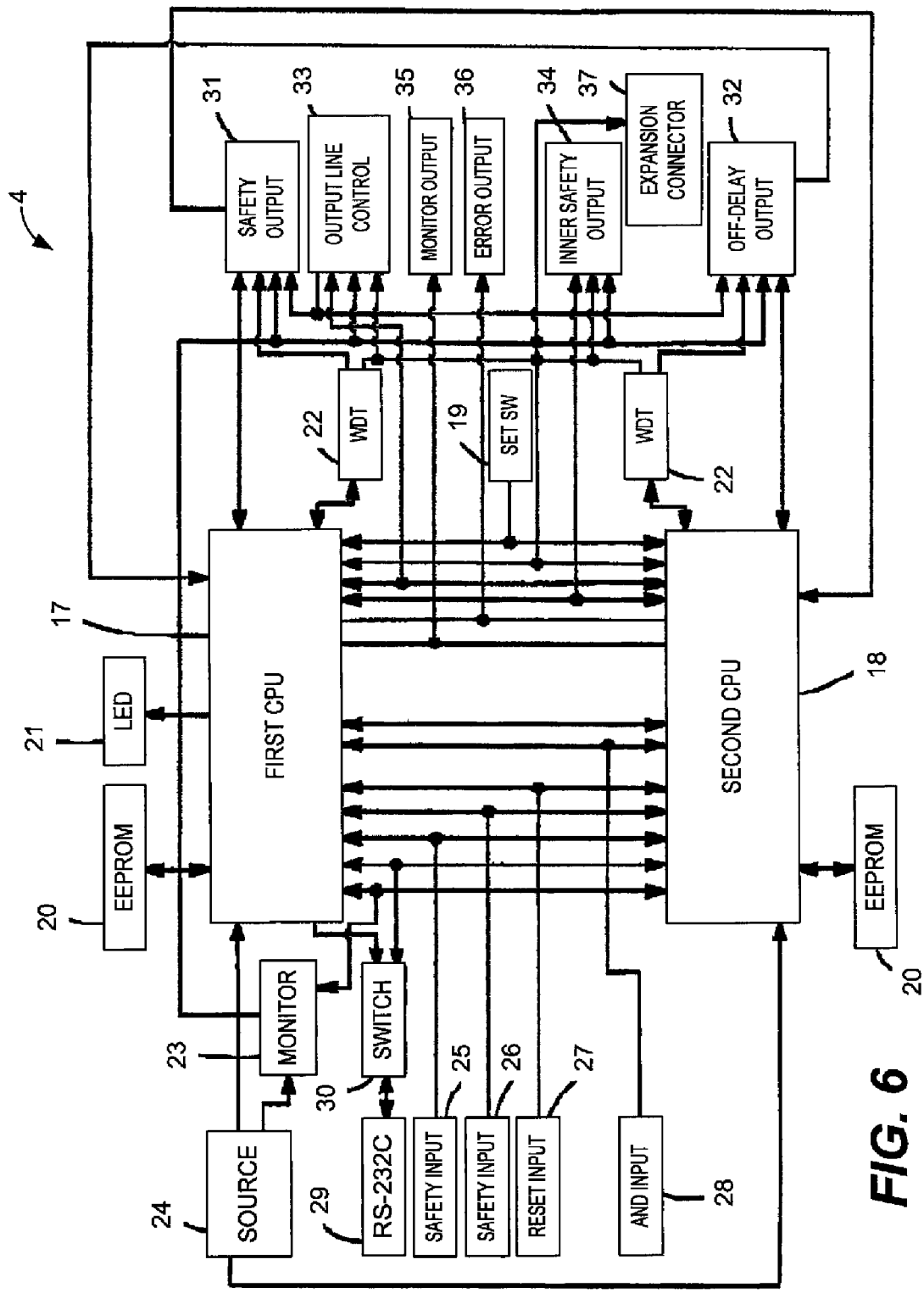
FIG. 6 is a block diagram of an advanced unit of FIG. 1.

FIG. 6 is a block diagram of the advanced unit 4. Numerals 17 and 18 therein indicate two CPUs (the first and second CPUs) serving as its control units for carrying out identical processes for duplicity (doubling). Each of the CPUs 17 and 18 is adapted to carry out communications for synchronizing software processing through inter-CPU communication ports. The CPUs 17 and 18 are each connected to a non-volatile memory 20 for storing the condition of a setting switch 19 (such as the aforementioned slide switch), an LED for displaying the conditions of the aforementioned power source (PWR) and error condition (ERR), a watchdog timer 22 using a delay IC and a monitor circuit 23 for monitoring the condition of a source circuit 24 for supplying power to various parts. In FIG. 6, numerals 25 and 26 each indicate a system of doubled safety inputs. They may each be, for example, an input from a single safety door switch. Numeral 27 indicates a reset input circuit for providing a feedback input or a reset input. Numeral 28 indicates an AND input circuit adapted to receive an inner safety input which is a logical connection output from the basic unit 3 or the advanced unit 4 on the upstream side. Numerals 29 and 30 are respectively an RS232 circuit for communication with an external personal computer and a switch. Numeral 31 indicates a safety output circuit for an instantaneous use. Numeral 32 indicates a safety output circuit for off-delay. Numeral 33 indicates a output line control circuit for doubling. Numeral 34 indicates an inner safety output circuit for outputting an inner safety output to an advanced unit 4 on the downstream side. Numeral 35 indicates a monitor output circuit for outputting a safety instantaneous output to a programmable controller (PLC) or the like for the purpose of monitoring. Numeral 36 is an error output circuit for providing an error output at the time of an inner error. Numeral 37 indicates a connector for connecting an expansion unit 5.

The first and second CPUs 17 and 18, as control units, serve to control the safety output circuit 31 and 32 and the inner safety output circuit 34 according to a program and based on safety inputs from the safety input circuits 25 and 26 and inner safety inputs from the AND input circuit 28, thereby controlling the safety output and the inner safety output which are solid-state outputs (transistor outputs). The inner safety output circuit 34 is provided with a transistor for solid-state output.

Figure 7:
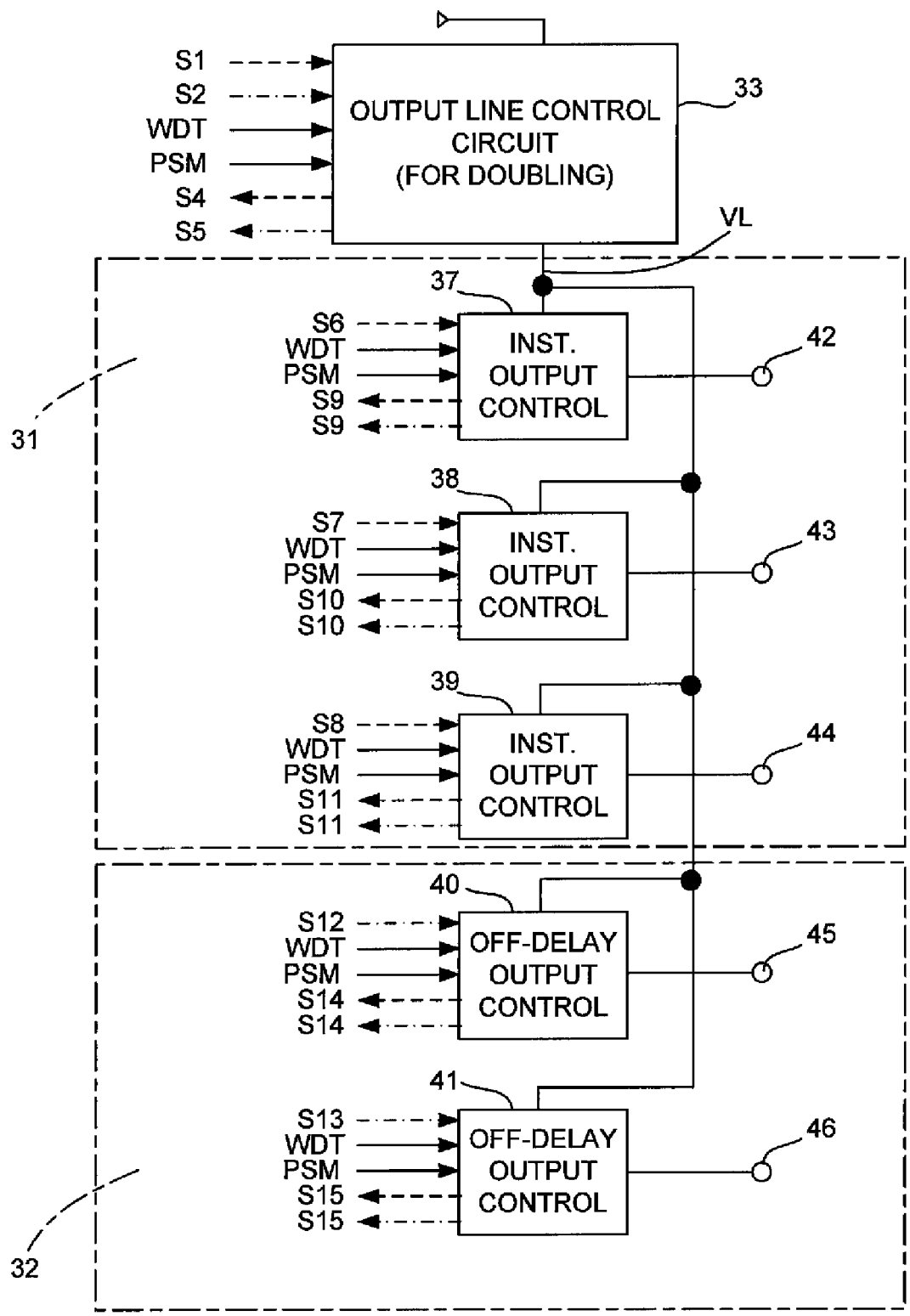
FIG. 7 is a block diagram showing a portion of FIG. 6 more in detail.

FIG. 7 is a block diagram for showing the structure of the safety output circuit 31 for an instantaneous use and the safety output circuit 32 for off-delay in FIG. 6, showing the same numerals for indicating the same components. In FIG. 7, the signals from and for the first CPU 17 are shown by arrows with broken lines and those from and for the second CPU 18 are shown by arrows with chain lines.

The safety output circuit 31 for an instantaneous use is provided with three instantaneous output control units 37-39 and the safety output circuit 32 for off-delay has two off-delay output control units 40 and 41. Each of these control units 37-41 is provided with a transistor for solid-state outputs.

The output line control circuit 33 for doubling safety outputs is adapted to receive drive signals S1 and S2 from the first and second CPUs 17 and 18, WDT signal from the watchdog timer 22 and PSM signal from the monitor circuit 23 for monitoring the source circuit 24. When the drive signals S1 and S2 are both switched on, a voltage comes to be applied to power source line VL and power is supplied to each of the output control units 37-41. The WDT signal from the watchdog timer 22 is also supplied to the output control units 37-41. The WDT signal is switched off when the watchdog timer 22 is not reset such that the safety outputs from all of the output control units 37-41 are switched off so as to prevent the operations of the machine equipment and to thereby secure safety. The PSM signal from the monitor circuit 23 is also supplied to the output control units 37-41. When an abnormal condition in the power source is detected, the PSM signal is switched off such that the safety outputs from all of the output control units 37-41 are switched off so as to prevent the operations of the machine equipment and to thereby secure safety.

The output line control circuit 33 outputs monitor signals S4 and S5 to the first and second CPUs 17 and 18, respectively. These monitor signals S4 and S5 are switched on when there is an abnormal condition in the output line control circuit 33 or when the aforementioned WDT signal or PSM signal is switched off.

The instantaneous output control units 37-39 of the safety output circuit 31 for an instantaneous use are adapted to receive drive signals S6-S8 for instantaneous output respectively from the first CPU 17 such that the logic of on/off (safe/danger) of the safety instantaneous output is respectively controlled by these drive signals S6-S8. In other words, when these drive signals S6-S8 are switched on and the power source line VL is switched on, safety instantaneous outputs showing safe conditions are outputted from the instantaneous output terminals 42-44.

The instantaneous output control units 37-39 are also adapted to output monitor signals S9-S11 respectively to the first and second CPUs 17 and 18. If each of these instantaneous output control units 37-39 is under a normal condition, these monitor signals S9-S11 turn out to be logical inverse of the drive signals S6-S8.

Drive signals S12 and S13 of off-delay output from the second CPU 18 are respectively applied to the off-delay output control units 40 and 41 of the safety output circuit 32 for off-delay and the logic of on/off (safe/danger) of the safety off-delay output is controlled by these drive signals S12 and S13. In other words, when these drive signals S12 and S13 are switched on and the aforementioned power source line VL is switched on, the switched-on safety off-delay outputs showing safe condition are outputted from off-delay output terminals 45 and 46, respectively.

The off-delay output control units 40 and 41 are respectively outputting monitor signals S14 and S15 to the first and second CPUs 17 and 18. If each of the off-delay output control units 40 and 41 is normal, these monitor signals S14 and S15 turn out to be logical inverse of the drive signals S12 and S13.

When there is an abnormal condition in the instantaneous output control units 37-39 or the off-delay output control units 40 and 41, the output line control circuit 33 for doubling the safety output switches off the power source line VL and thereby switches off all safety outputs from the instantaneous output terminals 42-44 and the off-delay output terminals 45 and 46 to secure safety.

When there is an abnormal condition in the output line control circuit 33 itself, instead, the instantaneous output control units 37-39 and the off-delay output control units 40 and 41 switch off the safety outputs from the instantaneous output terminals 42-44 and the off-delay output terminals 45 and 46 to secure safety.

Figure 8:
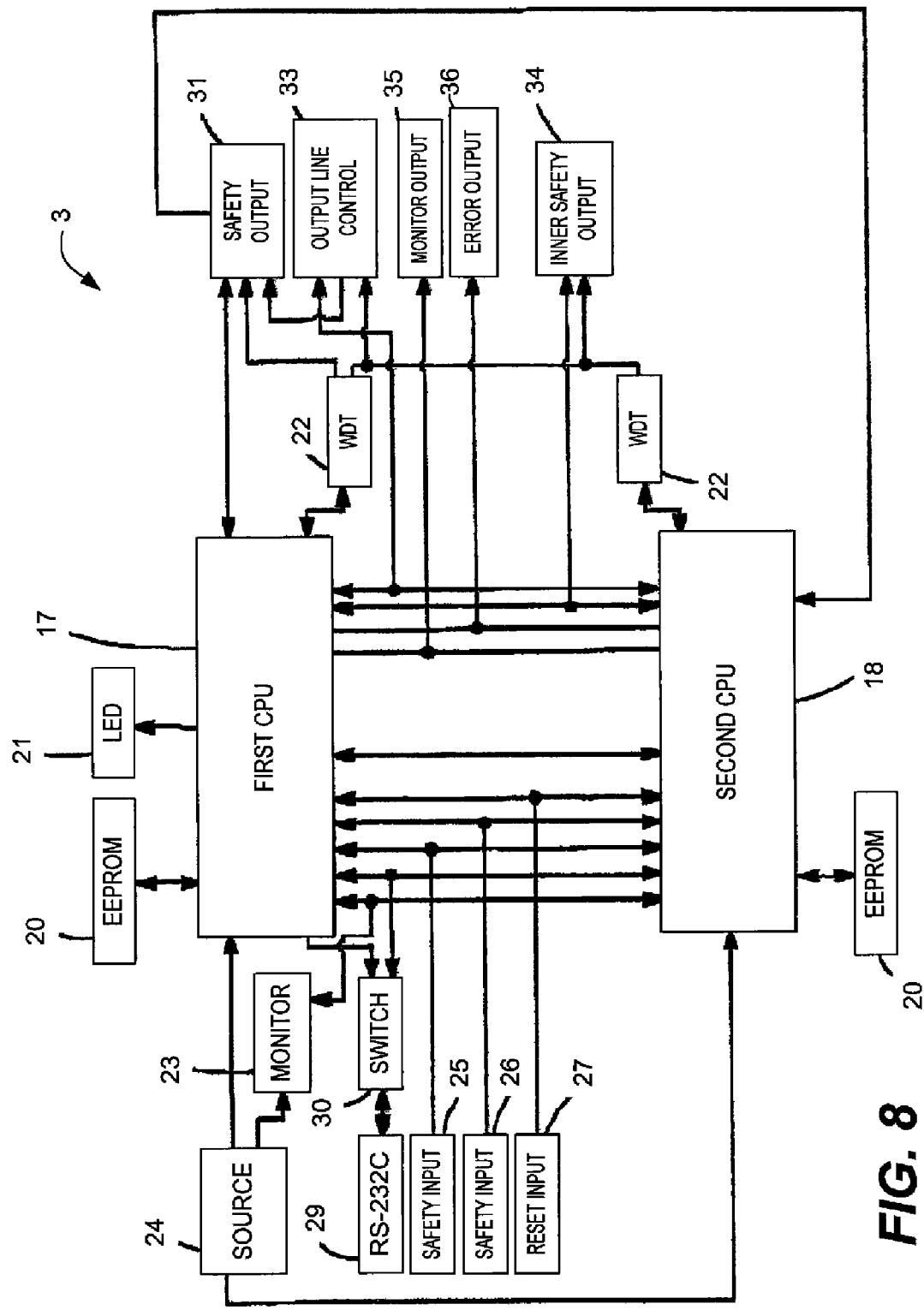
FIG. 8 is a block diagram of the basic unit of FIG. 1.

FIG. 8 is a block diagram of the basic unit 3. Components which correspond to those shown in FIG. 6 are indicated by the same numerals.

As can be understood by comparing FIGS. 6 and 8, the basic unit 3 is basically structured similarly to the advanced unit 4 except aforementioned AND input circuit 28, the safety output circuit 32 for off-delay, the setting switch 18 and the connector 37 for the setting switch 19 are not provided. Since the safety output (solid-state output) is thus controlled according to a program by a control unit comprised of the first and second CPU 17 and 18, the number of wirings can be reduced because there is no need to build up a safety circuit by a relay sequence, unlike conventional relay units containing electronic relays. Moreover, when it is desired by the maker to modify a portion of the system, this can be accomplished easily by a software change.

Next, the operations of each unit will be described by way of examples.

Figure 9:
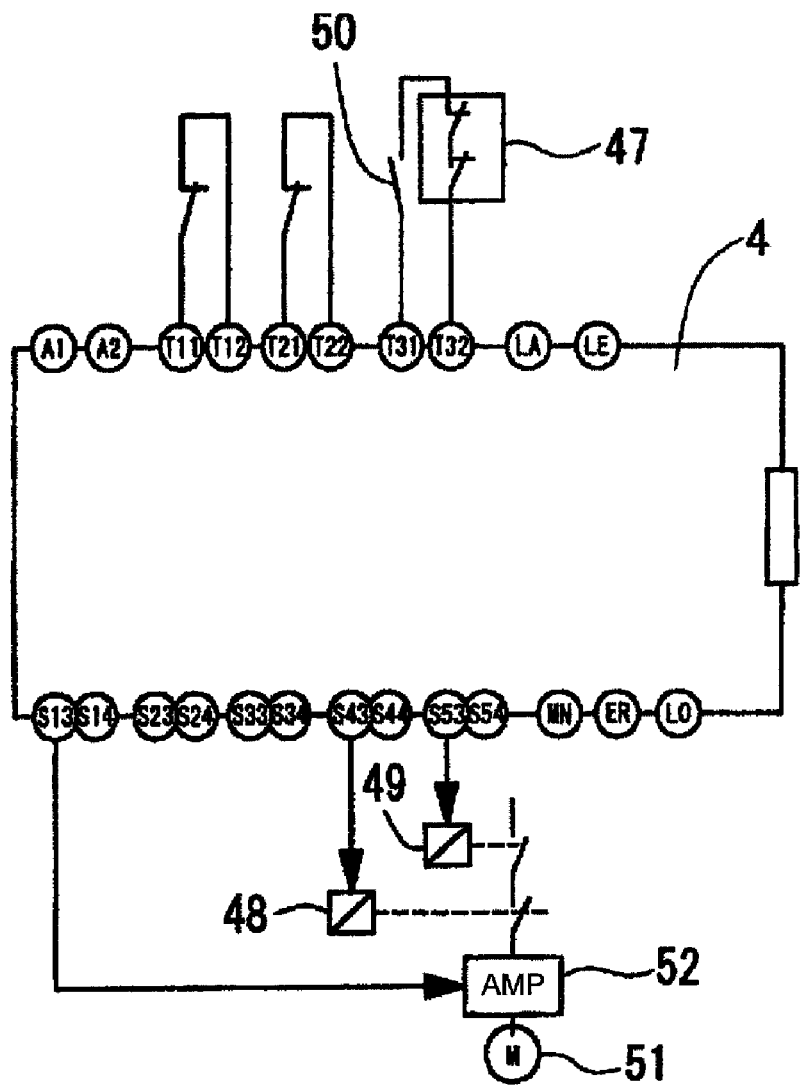
FIG. 9 shows an example of connection diagram.
Figure 10:
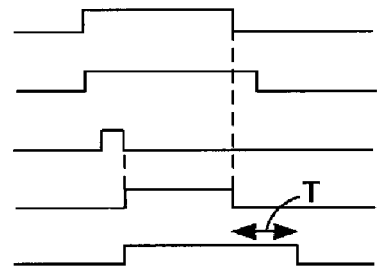
FIG. 10 is a time chart for the connection of FIG. 9.

FIG. 9 shows a connection when a single advanced unit 4 is used and FIG. 10 is a corresponding time chart. In this example, a single safety door switch is connected to a first safety input of terminals T11 and T12 and a second safety input of terminals T21 and T22 of the advanced unit 4, and the b-junction of a magnet contactor and a reset button 50 are connected in series to a feedback loop 47. Instantaneous output terminal S13 is connected to an amplifier 52 and off-delay output terminals S42 and S53 are connected to magnet contactors 48 and 49. In this example, a specified time T is set as the off-delay time.

As the door equipped with the safety door switch is closed and the two safety inputs 1 and 2 are switched on (as shown in (A) and (B) of FIG. 10) and the reset input is switched on and off (as shown in (C) of FIG. 10), the safety instantaneous output from terminal S13 is switched on (as shown in (D) of FIG. 10) and the safety off-delay outputs of terminals S43 and S53 are switched on (as shown in (E) of FIG. 10) such that the main contacts of the magnet contactors 48 and 49 are switched on, the motor 51 is activated and machine equipment comes to be operated.

If the door is opened under such a condition, the two safety inputs 1 and 2 are switched off. Although the two safety inputs 1 and 2 are generally switched on and off simultaneously together, FIG. 10(B) shows a situation where the second safety input 2 is switched off with a slight delay.

As either of the two safety inputs 1 and 2 is switched off, the safety instantaneous output is switched off as shown in FIG. 10(D). The safety off-delay output is switched off after a specified time interval T by being slowed down by the amplifier 52 such that the principal junctions of the magnet contactors 48 and 49 are switched off to shut of the power to the motor 51, thereby stopping the operations of machine equipment.

Figure 11:
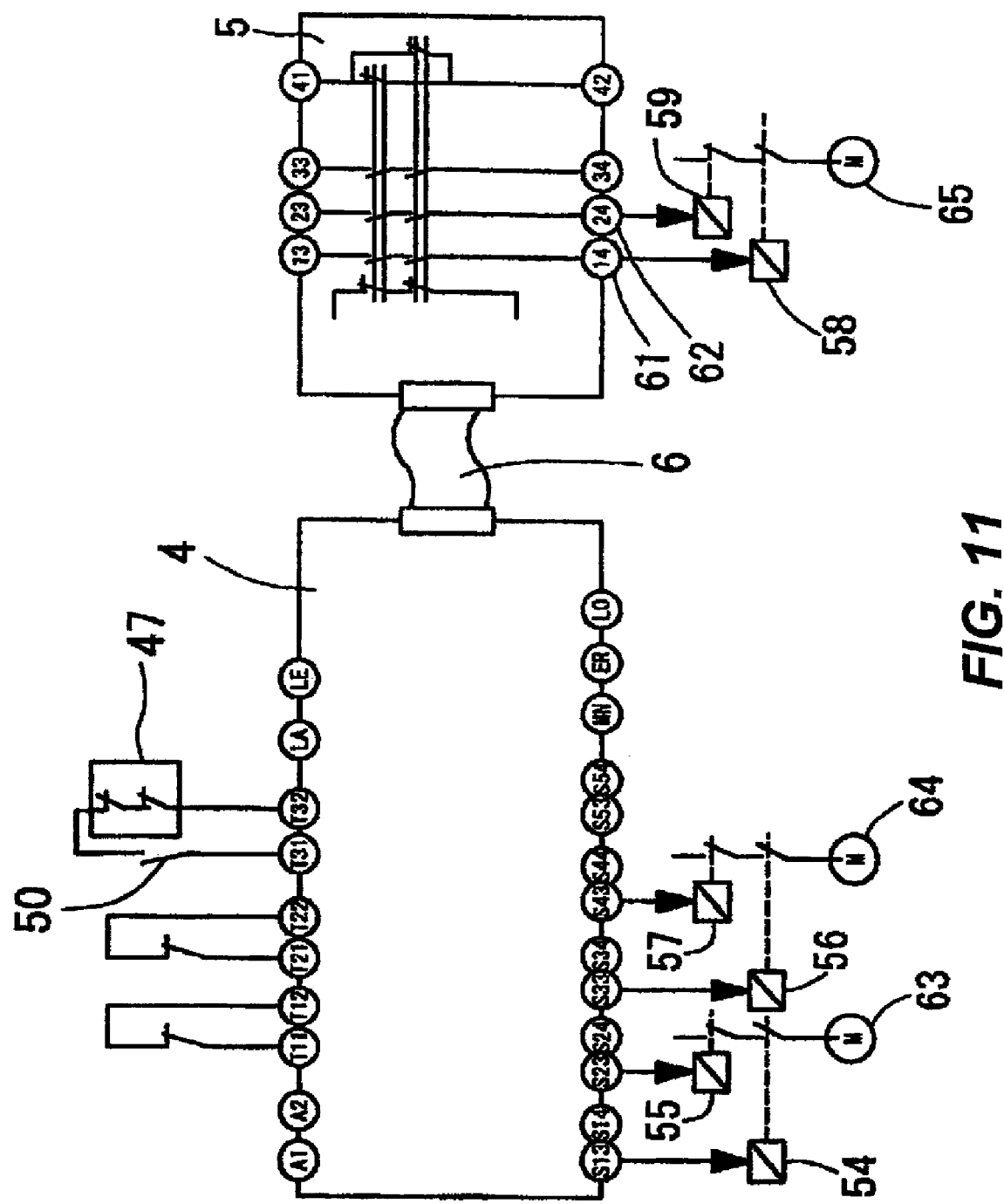
FIG. 11 shows a second example of connection.
Figure 12:
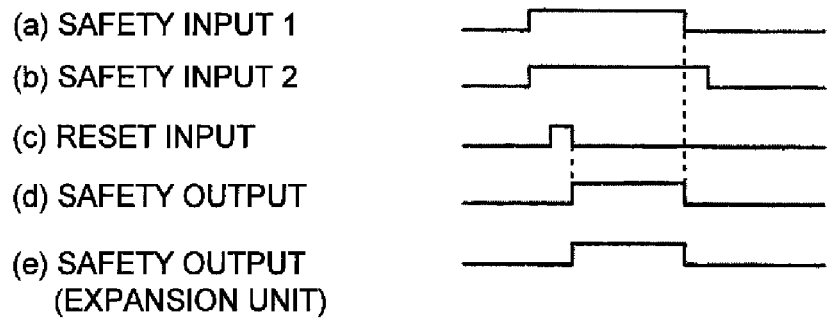
FIG. 12 is a time chart for the connection of FIG. 11.

FIG. 11 shows a second example where an expansion unit 5 of the instantaneous type is connected to an advanced unit 4, and FIG. 12 is a corresponding time chart. In this example, a single safety door switch is connected to a first safety input of terminals T11 and T12 and a second safety input of terminals T21 and T22 of the advanced unit 4, and the b-junction of a magnet contactor and a reset button 50 are connected in series to a feedback loop 47. Instantaneous output terminals S13 and S23 are connected to magnet contactors 54 and 55 and off-delay output terminals S33 and S43 are connected to the magnet contactors 56 and 57. In this example, the off-delay time is set T=0, that is, it is set for an instantaneous output. Instantaneous output terminals 61 and 62 of the expansion unit 5 containing a plurality of electromagnetic relays are connected to magnet contactors 58 and 59.

As the door equipped with the safety door switch is closed and the two safety inputs 1 and 2 of the advanced unit 4 are switched on (as shown in (A) and (B) of FIG. 12) and the reset input is switched on and off (as shown in (C) of FIG. 12), the safety instantaneous output of the advanced unit 4 is switched on (as shown in (D) of FIG. 12) and the safety instantaneous output of the expansion unit 5 is switched on (as shown in (E) of FIG. 12) such that each of the magnet contactors 54-59 is switched on, the motors 63-65 are activated and machine equipment comes to be operated.

If the door is opened under such a condition, the two safety inputs 1 and 2 are switched off as shown in FIGS. 12(A) and (B), causing the safety instantaneous output of the advanced unit 4 to be switched off as shown in FIG. 12(D) and the safety instantaneous output of the expansion unit 5 to be switched off such that each of the magnet contactors 54-59 is switched off to shut of the power to the motors 63-65 and the operations of the machine equipment are stopped.

By thus connecting an expansion unit 5 to an advanced unit 4 through a cable 6, the number of safety outputs can be easily increased.

Figure 14:
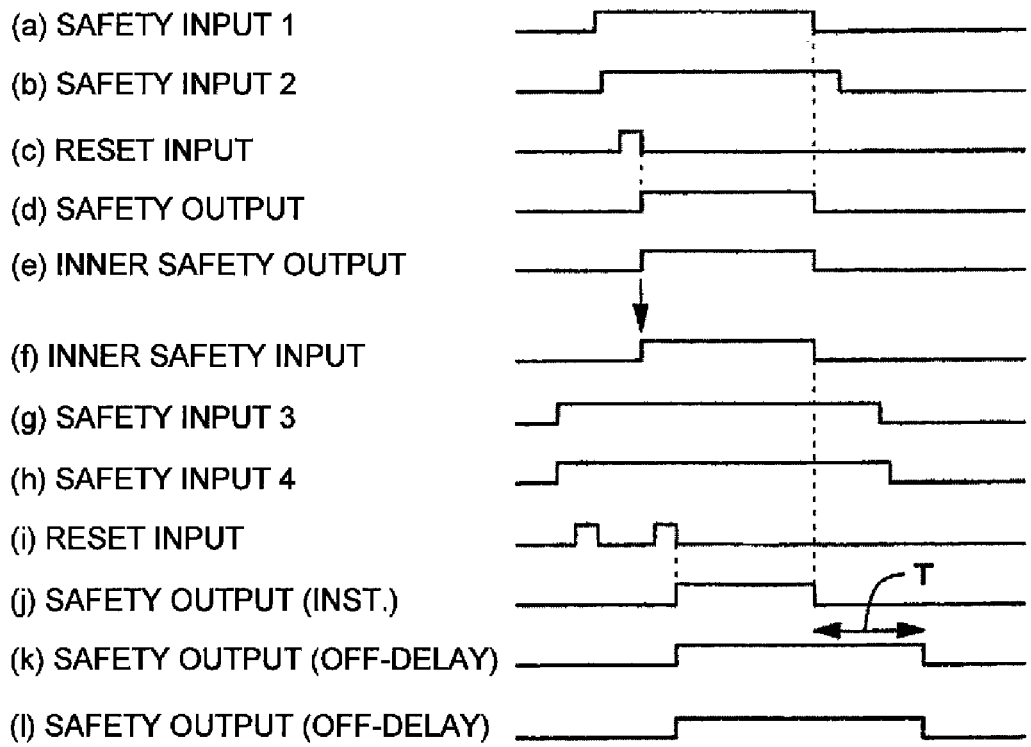
FIG. 14 is a time chart for the connection of FIG. 13.
Figure 13:
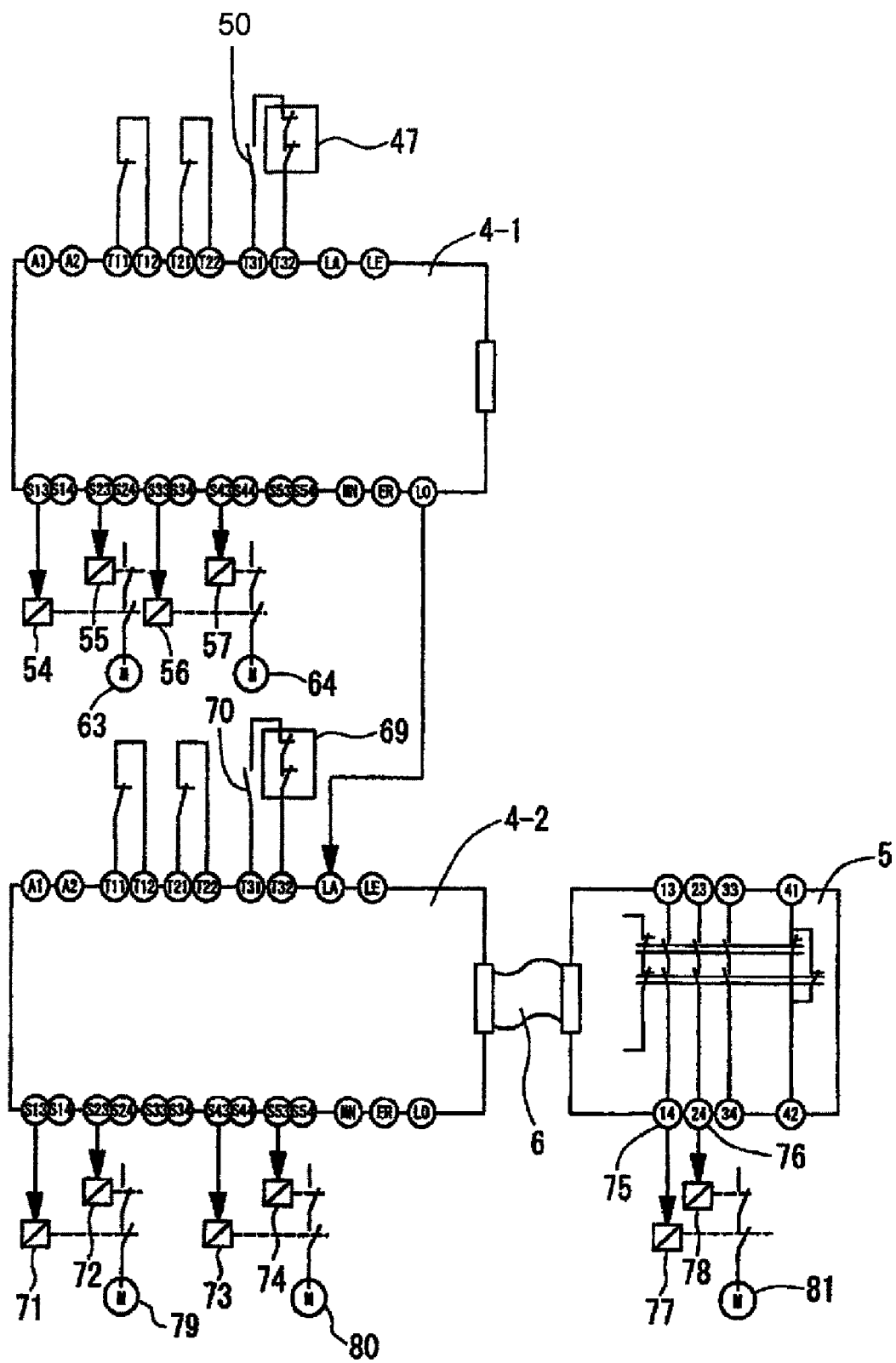
FIG. 13 shows a third example of connection.

FIG. 13 shows a third example where an expansion unit 5 of the off-delay type is connected to two advanced units 4-1 and 4-2, and FIG. 14 is a corresponding time chart. For the convenience of explanation, the two safety inputs of the second advanced unit 4-2 will be hereinafter referred to as safety inputs 3 and 4.

In this example, a single safety door switch is connected to safety input 1 of terminals T11 and T12 and safety input 2 of terminals T21 and T22 of the first advanced unit 4-1 and the b-junction of a magnet contactor and a reset button 50 are connected in series to a feedback loop 47. Instantaneous output terminals S13 and S23 are connected to magnet contactors 54 and 55 and off-delay output terminals S33 and S43 are connected to magnet contactors 56 and 57. For the first advanced unit 4-1, the off-delay time is set T=0. The inner safety output terminal LO is connected to the inner safety input terminal LA of the second advanced unit 4-2 such that the inner safety output of the first advanced unit 4-1 is provided as the AND input of the second advanced unit 4-2 on the downstream side.

In this example, another single safety door switch is connected to safety input 3 of terminals T11 and T12 and safety input 4 of terminals T21 and T22 of the second advanced unit 4-2 and the b-junction of a magnet contactor and a reset button 70 are connected in series to a feedback loop 69. Instantaneous output terminals S13 and S23 are connected to magnet contactors 71 and 72 and off-delay output terminals S43 and S53 are connected to magnet contactors 73 and 74. For the second advanced unit 4-2, a specified time T is set as the off-delay time. Off-delay output terminals 75 and 76 of the expansion unit 5 containing a plurality of electromagnetic relays are connected to magnet contactors 77 and 78.

If the door of the safety door switch connected to the first advanced unit 4-1 is closed and the two safety inputs 1 and 2 are switched on as shown in FIGS. 14(A) and 14(B) and the reset input is switched on and off as shown in FIG. 14(C), the safety instantaneous output of the first advanced unit 4-1 is switched on. As a result, the principal junctions of the magnet contactors 54-57 of the first advanced unit 4-1 are switched on as shown in FIG. 14(D), and the motors 63 and 64 are activated. An inner safety output which is the same as this safety instantaneous output of the first advanced unit 4-1 is applied as the AND input of the second advanced unit 4-2.

The second advanced unit 4-2 switches on its safety output when the inner safety input is switched on as shown in FIG. 14(F) and the safety input of the second advanced unit 4-2 is in the safe condition. When the inner safety input is switched on, since the door of the safety door switch connected to the second advanced unit 4-2 is closed and the two safety inputs 3 and 4 are switched on as shown in FIGS. 14(G) and 14(H), the reset input is switched on and off as shown in FIG. 14(I) and the AND condition is established such that the safety instantaneous output and the safety off-delay output of the second advanced unit 4-2 are switched on as shown in FIGS. 14(J) and 14(K) and the safety off-delay output of the expansion unit 5 is switched on. Thus, the magnet contactors 71-74, 77 and 78 of the second advanced unit 4-2 and the expansion unit 5 are switched on and the motors 79-81 are activated.

Under this condition, if the door of the safety door switch connected to the first advanced unit 4-1 is opened, for example, the two safety inputs 1 and 2 of the first advanced unit 4-1 is switched off as shown in FIGS. 14(A) and 14(B) and the safety instantaneous output of the first advanced unit 4-1 is switched off as shown in FIG. 14(D) such that the magnet contactors 54-57 are switched off, power to the motors 63 and 64 are shut off and the inner safety output to the second advanced unit 4-2 is switched off as shown in FIG. 14(E).

As the inner safety input from the first advanced unit 4-1 is switched off as shown in FIG. 14(F), the safety instantaneous output from the second advanced unit 4-2 is switched off as shown in FIG. 14(J), the magnet contactors 71 and 72 are switched off to shut of the power to the motor 79 and after a delay of a certain time T, the safety off-delay output is switched off as shown in FIG. 14(K) and the safety off-delay output of the expansion unit 5 is switched off as shown in FIG. 14(L). Thus, the contactors 73, 74, 77 and 78 are all switched off and the power to the motors 80 and 81 is shut off.

Thus, the safety output from the second advanced unit 4-2 can be easily correlated to that from the first advanced unit 4-1 by means of logical connection using inner safety outputs.

Figure 15:
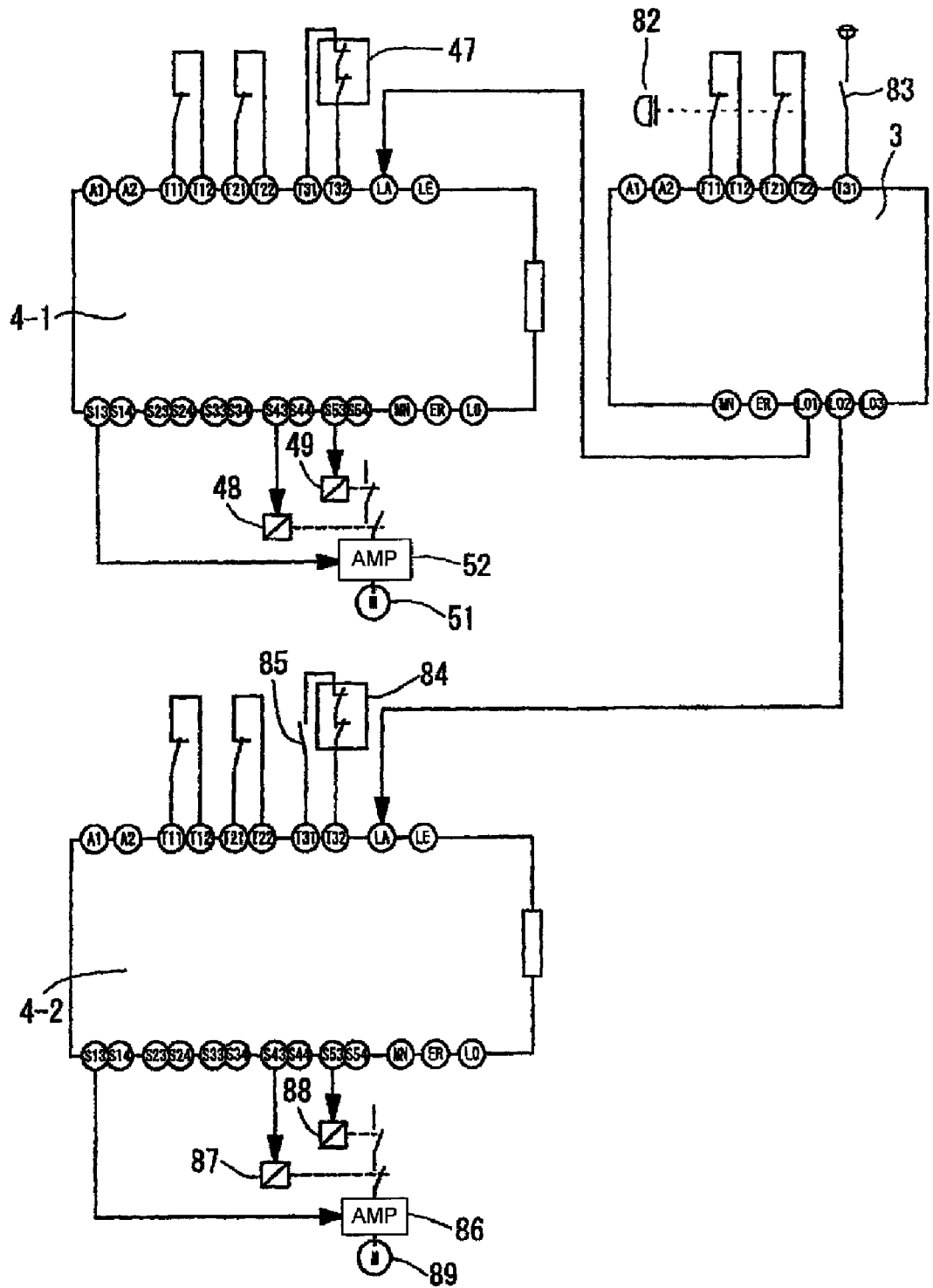
FIG. 15 shows a fourth example of connection.
Figure 16:
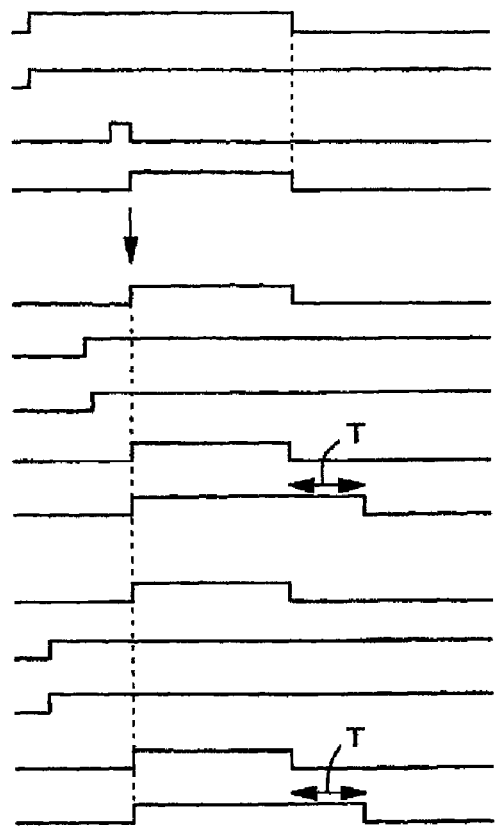
FIG. 16 is a time chart for the connection of FIG. 15.

FIG. 15 shows a fourth example where a basic unit 3 is connected to two advanced units 4-1 and 4-2, and FIG. 16 is a corresponding time chart. For the convenience of explanation, the two safety inputs of the basic unit 3 will be hereinafter referred to as safety inputs 5 and 6.

In this example, an emergency stop switch 82 is connected to safety input 5 of terminals T11 and T12 and safety input 6 of terminals T21 and T22 of the basic unit 3 and a reset button 83 is connected to a reset input. The inner safety output terminals L01 and L02 of this basic unit 3 are respectively connected to the inner safety input terminals LA of the first and second advanced units 4-1 and 4-2.

A single safety door switch is connected to safety input 1 of terminals T11 and T12 and safety input 2 of terminals T21 and T22 of the first advanced unit 4-1 and the b-junction of a magnet contactor is connected in series to a feedback loop 47. Instantaneous output terminal S13 is connected to an amplifier 52 and off-delay output terminals S43 and S53 are connected to magnet contactors 48 and 49. In this example, a specified time T is set as the off-delay time.

Another single safety door switch is connected to safety input 3 of terminals T11 and T12 and safety input 4 of terminals T21 and T22 of the second advanced unit 4-2 and the b-junction of a magnet contactor and a reset button 85 are connected in series to a feedback loop 84. Instantaneous output terminal S13 is connected to an amplifier 86 and off-delay output terminals S43 and S53 are connected to magnet contactors 87 and 88. In this example, a specified time T is set as the off-delay time.

When the emergency stop switch 82 is not being operated, the two safety inputs 5 and 6 of the basic unit 3 are switched on as shown in FIGS. 16(A) and 16(B) and the reset input is switched on and off as shown in FIG. 16(C) such that the inner safety output of the basic unit 3 is switched on as shown in FIG. 16(D) and this inner safety output is received as AND input by the inner safety input of the first and second advanced units 4-1 and 4-2 as shown in FIGS. 16(E) and 16(J).

The first advanced unit 4-1 switches on its safety output when the inner safety input is switched on and the first advanced unit 4-1 is in the safe condition. When the inner safety input is switched on, the door of the safety door switch connected to the first advanced unit 4-1 is closed as shown in FIGS. 16(F) and 16(G) and the two safety inputs 1 and 2 are switched on. Thus, the safety instantaneous output and the safety off-delay output are switched on as shown in FIGS. 16(H) and 16(I) in response to the inner safety input and the principal junctions of the magnet contactors 48 and 49 are switched on and the motor 51 is activated.

Similarly, the second advanced unit 4-2 responds to the inner safety input from the basic unit 3, switching on the safety instantaneous output and the safety off-delay output as shown in FIGS. 16(M) and 16(N) and switching on the principal junctions of the magnet contactors 87 and 88 to activate the motor 89.

If the emergency stop switch 82 connected to the basic unit 3 is operated under this condition, the two safety inputs 5 and 6 of this single-function 3 are switched off as shown in FIGS. 16A and 16B and the inner safety output is switched off as shown in FIG. 16(D). Although the safety inputs 5 and 6 are generally switched off simultaneously, FIG. 16(B) illustrates a situation where the safety input 6 remains switched on.

As the inner safety output of the basic unit 3 is switched off and hence the inner safety inputs of FIGS. 16(E) and 16(J) are switched off, the safety instantaneous inputs of the first and second advanced units 4-1 and 4-2 are switched off as shown in FIGS. 16(H) and 16(M) and slowed down by the amplifiers 52 and 86 and after a delay by a specified time T as shown in FIGS. 16(I) and 16(N), the safety off-delay output is switched off. Thus, the principal junctions of the magnet contactors 48, 49, 87 and 88 are switched off and the power to the motors 51 and 89 is shut off.

Thus, the safety output from the first and second advanced units 4-1 and 4-2 can be easily correlated to the inner safety output from the basic unit 3.

Figure 17A:
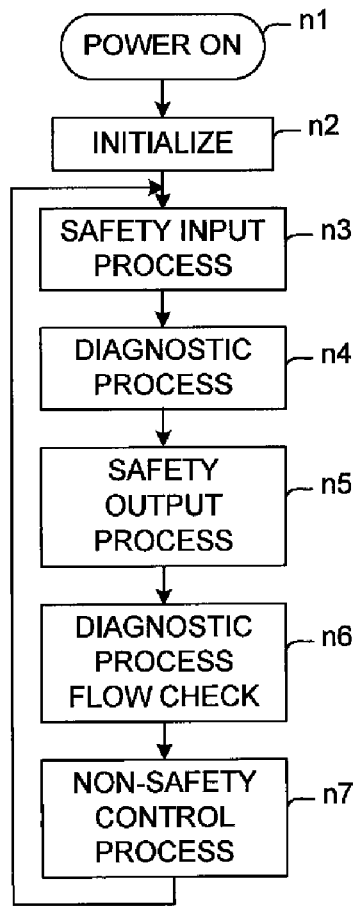
FIG. 17A is a flow chart for the operations and FIG. 17B is a portion thereof shown more in detail.

Next, the operations of an advanced unit 4 as described above are explained by way of a flowchart. FIG. 17A shows the overall operations and FIG. 17B shows the operations of the safety input and safety output when an inner safety input is received from another advanced unit and a logical connection is made through AND.

With reference firstly to FIG. 17A, as power is switched on (Step n1), initialization processes are carried out (Step n2) such as the initialization of the CPU as the control unit, self-diagnostic processes and input of set conditions. After a safety input process to be described below (Step n3), a diagnostic process (Step n4) is carried out including various processes of self-diagnosis such as checking abnormal operations in inner circuits, erroneous wiring in input devices and connection to target devices of control for safety output and short-circuits at terminals. Thereafter, a safety output process (Step n5) to be described below is carried out and a diagnostic process flow check (Step n6) is carried out to check whether a diagnostic process program has been carried out according to a predetermined sequence. Next, a non-safety control process (Step n7) including an error process, a monitor output and a display control is carried out and the process returns to Step n3.

Figure 17B:
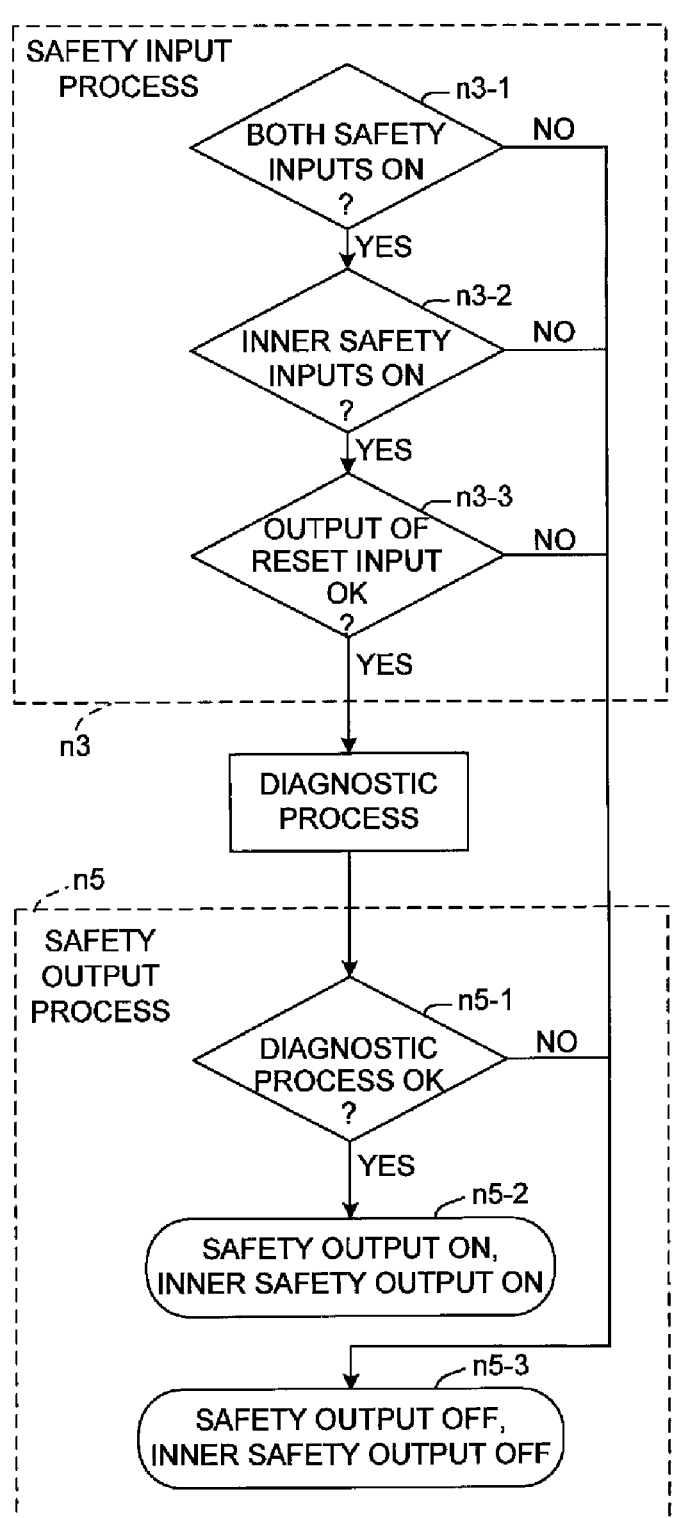

In the safety input process of Step n3, as shown in FIG. 17B, it is initially determined whether the aforementioned safety inputs 1 and 2 are both switched on (such that these safety inputs are both in the safe condition) (Step n3-1). If they are found to be in the safe condition (YES in Step n3-1), it is determined whether the inner safety input is switched on (or in the safe condition) (Step n3-2). If it is found to be in the safe condition (YES in Step n3-2), it is determined whether the reset input is in the condition that will allow a safety output to be outputted (Step n3-3). If the reset input is in the safe condition (YES in Step n3-3), the process returns to Step n4.

If both safety inputs are not switched on (not in the safe conditions) in Step n3-1, if the inner safety input is not switched on (not in the safe condition) in Step n3-2 or if the reset input is not in the condition of allowing the input in Step n3-3, the process proceeds to the safety output process (Step n5) and the safety output and the inner safety output are switched off (in the danger conditions) (Step n5-3).

In the safety output process (Step n5), it is determined whether the result in the diagnostic process (Step n4) was OK, that is, whether there was no abnormality (Step S5-1). If the result in the diagnostic process was OK (YES in Step n5-1), the safety output and the inner safety output are switched on (indicating safe conditions) (Step n5-2). If the result in the diagnostic process was not OK (NO in Step n5-1), the safety output and the inner safety output are switched off (in the danger conditions) (Step n5-3).

Figure 18:
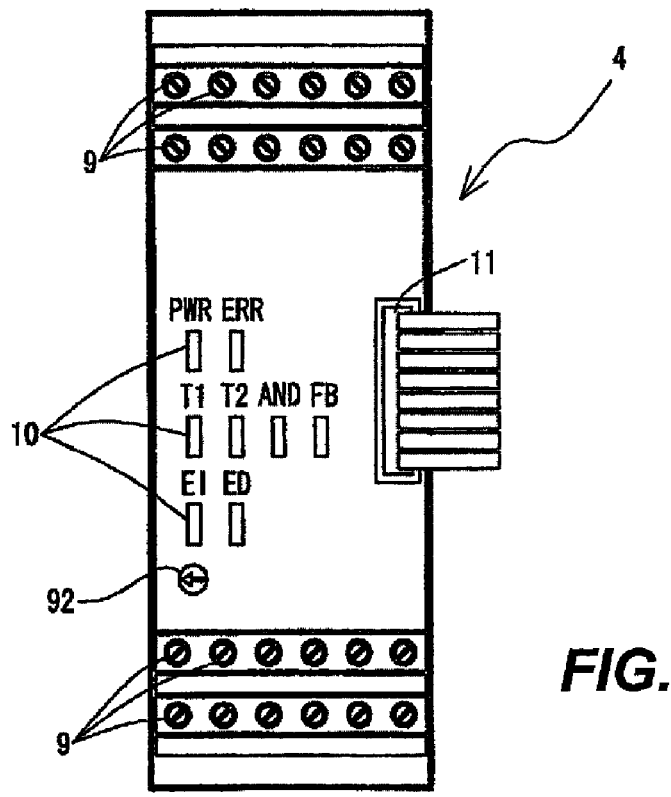
FIG. 18 is a front view of another advanced unit.
Figure 19:
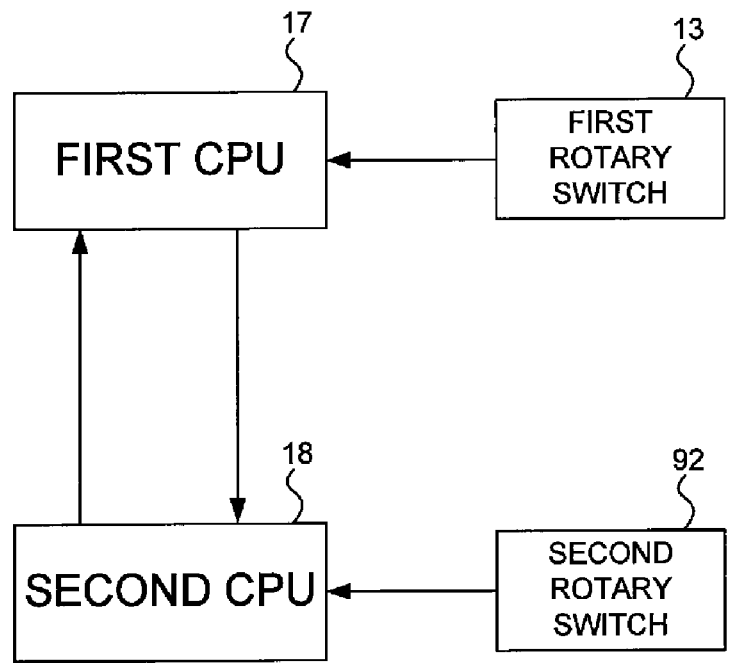
FIG. 19 is a block diagram for doubled setting part.

Although an embodiment was shown above wherein the slide switch 12 and the rotary switch 13 would become inaccessible (not visible or operable) after the unit 4 is set to the DIN rail 85 but a second rotary switch 92 may be provided in front of the case as shown in FIG. 18 for doubling such that the set content of the off-delay time may be easily ascertained. In such an example, the rotary switch 13 on the back surface as previously described may be referred to as the first rotary switch while the one on the front surface (indicated at 92) may be referred to as the second rotary switch.

Outputs from the first and second rotary switches 13 and 92 are respectively received by the aforementioned first and second CPUs 17 and 18 which serve to compare and determine whether or not they match. If they match, the off-delay time is accordingly set. If they are found not to match, an error display may be made and the operation of machine equipment is prevented.

If the rotary switch is thus doubled, when one of the two rotary switches is in an abnormal condition, say, due to a defective connection or a short circuit, the two rotary switches are effectively set differently and this difference in setting is detected by the two CPUs 17 and 18 and hence a high safety level can be thereby maintained. Since the second rotary switch 92 is disposed at an easily visible position on the front surface of the case, the user can easily check what off-delay time has been set.

Many other modifications and variations are possible within the scope of this invention. The basic unit 3 and the advanced unit 4 need not each comprise two CPUs but may include only one CPU.

Figure 20:
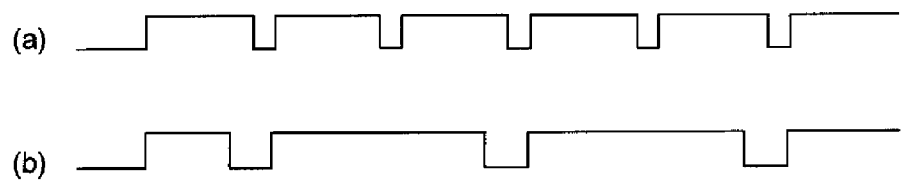
FIG. 20 shows signal patterns for inner safety output.

As another example, the logical connection need not be through an AND but may be through an OR or an XOR. A plurality of logical connections may be possible. For such a purpose, it is preferable to make the inner safety output to have a different signal pattern from that of the safety output to the target of safety output control. For example, the safety output may be set such that an on-signal indicates the safe condition and an off-signal indicates the danger condition while the inner safety output may be set such that an on-off signal at a specified frequency indicates the safe condition and an off-signal indicates the danger condition. In this manner, the aforementioned specified frequency or duty ratio may be varied as shown in FIG. 20 such that each of a plurality of different logics may be made use of. It also goes without saying that the numbers of safety outputs and inner safety outputs (inner safety inputs) of the single-function and advanced units 3 and 4 do not limit the scope of the invention.

According to this invention, safety circuits need not be formed by relay sequence unlike with a relay unit of a prior art type comprised of electromagnetic relays. Thus, the wiring can be simplified and the maker can easily change a portion of a system through software, say, in response to a request by the user. A system of this invention can also be expanded easily by correlating additional safety controllers through logic by using their connection outputs.

What is claimed is:

1. A plurality of safety controllers for providing a safety output to a target controlled system based on an input from an input device to thereby control operation of machine equipment, said safety controllers forming a safety circuit that supplies power to said machine equipment only when safety condition is maintained by said plurality of safety controllers, each of said safety controllers comprising:
   a plurality of safety output parts for transmitting a solid-state output as said safety output;
   a connection output part for transmitting a connection output to another safety controller;
   a control part for controlling said safety output and said connection output according to a program based on the input from said input device;
   a connection input part for receiving a connection output from another safety controller as a connection input; and
   a setting part for setting to enable and disable the connection input from said connection input part;
   wherein said control part controls said safety output and said connection output based on an input from said input device and connection input from said connection input part;
   wherein said connection output is a solid-state output for logical connection;
   wherein said control part controls said safety output and said connection output by carrying out logical calculations according to said program based on said input from said input device and said connection input from said connection input part; and
   wherein said control part controls said safety output and said connection output by disabling said connecting input if said setting part sets for disablement.

2. The safety controllers of claim 1 wherein said control part controls output condition of said connection output according to said program in same way as the output condition of said safety output.

3. A plurality of safety controllers for providing a safety output to a target controlled system based on an input from an input device to thereby control operation of machine equipment, said safety controllers forming a safety circuit that supplies power to said machine equipment only when safety condition is maintained by said plurality of safety controllers, each of said safety controllers comprising:
- a plurality of safety output parts for transmitting a solid-state output as said safety output;
- a connection output part for transmitting a connection output to another safety controller;
- a control part for carrying out input process, diagnostic process and output process according to a program, said control part judging condition of input from said input device in said input process, carrying out self-diagnosis in said diagnostic process and controlling said safety output and said connection output based on results of said input process and said diagnostic process;
- a connection input part for receiving a connection output from another safety controller as a connection input; and
- a setting part for setting to enable and disable the connection input from said connection input part;
- wherein said control part judges conditions of input from said input device and of connection input from said connection input part in said input process, carries out self diagnosis in said diagnostic process and controls said safety output and said connection output based on results of said input process and said diagnostic process;
- wherein said connection output is a solid-state output for logical connection and said control part determines output conditions of said safety output and said connection output by a logical calculation on the input from said input device and the connection input from said connection input part in said input process and controls in said output process according to result of said diagnostic process said safety output and said connection output in a safe condition determined by said input process if there is no abnormality and in a predetermined output condition if there is an abnormality; and
- wherein said control part controls said safety output and said connection output by disabling said connecting input if said setting part sets for disablement.

4. The safety controllers of claim 3, each of said safety controllers further comprising a setting part for setting to enable and disable the connection input from said connection input part, wherein said control part controls said safety output and said connection output by disabling said connecting input if said setting part sets for disablement.

5. The safety controllers of claim 1 wherein said plurality of safety output parts include an instantaneous output part for outputting safety instantaneous outputs and an off-delay output part for outputting safety off-delay outputs.

6. The safety controllers of claim 1 wherein said safety output and said connection output have different signal patterns.

7. The safety controllers of claim 1, each of said safety controllers being connectable to an expansion unit that contains a plurality of electromagnetic relays and is adapted to output a relay output corresponding to said safety output.

8. The safety controllers of claim 1 wherein said control part comprises two CPUs.

9. The safety controllers of claim 1 wherein said setting part is provided such that said setting part cannot be operated when said safety controller is installed in a specified manner.

10. The safety controllers of claim 9 wherein said setting part is operable from a back surface of a case, said safety controller being installed in said specified manner by being attached over said back surface.

11. The safety controllers of claim 1 wherein said setting part comprises a first setting part adapted to set at least a part of items to be set by said setting part and a second setting part adapted to set the same part of said items, said control part having two CPUs consisting of a first CPU and a second CPU, outputs from said first and second setting parts being respectively transmitted to said first and second CPUs, each of said CPUs serving to compare the outputs from said first and second setting parts.

12. The safety controllers of claim 11 wherein said second setting part is visually observable when said safety controller is installed in a specified manner.

13. A system comprising a plurality of safety controllers for providing a safety output to a target controlled system based on an input from an input device to thereby control operation of machine equipment, said safety controllers forming a safety circuit that supplies power to said machine equipment only when safety condition is maintained by said plurality of safety controllers, each of said safety controllers comprising:
- a plurality of safety output parts for transmitting a solid-state output as said safety output;
- a connection output part for transmitting a connection output to another safety controller, said plurality of safety controllers being connected together through the connecting output parts;
- a control part for controlling said safety output and said connection output according to a program based on the input from said input device;
- a connection input part for receiving a connection output from another safety controller as a connection input; and
- a setting part for setting to enable and disable the connection input from said connection input part;
- wherein said control part controls said safety output and said connection output based on an input from said input device and connection input from said connection input part;
- wherein said connection output is a solid-state output for logical connection;
- wherein said control part controls said safety output and said connection output by carrying out logical calculations according to said program based on said input from said input device and said connection input from said connection input part; and
- wherein said control part controls said safety output and said connection output by disabling said connecting input if said setting part sets for disablement.

14. The safety controllers of claim 10 wherein said setting part comprises a first setting part adapted to set at least a part of items to be set by said setting part and a second setting part adapted to set the same part of said items, said control part having two CPUs consisting of a first CPU and a second CPU, outputs from said first and second setting parts being respectively transmitted to said first and second CPUs, each of said CPUs serving to compare the outputs from said first and second setting parts; and
- wherein said second setting part is visually observable when said safety controller is installed in said specified manner.

15. The safety controllers of claim 3 wherein said setting part is provided such that said setting part cannot be operated when said safety controller is installed in a specified manner; and wherein said setting part is operable from a back surface of a case, said safety controller being installed in said specified manner by being attached over said back surface.

16. The safety controllers of claim 3 wherein said setting part comprises a first setting part adapted to set at least a part of items to be set by said setting part and a second setting part adapted to set the same part of said items, said control part having two CPUs consisting of a first CPU and a second CPU, outputs from said first and second setting parts being respectively transmitted to said first and second CPUs, each of said CPUs serving to compare the outputs from said first and second setting parts; and wherein said second setting part is visually observable when said safety controller is installed in a specified manner.

17. The safety controllers of claim 16 wherein said setting part is provided such that said setting part cannot be operated when said safety controller is installed in said specified manner; and wherein said setting part is operable from a back surface of a case, said safety controller being installed in said specified manner by being attached over said back surface.

18. The system of claim 13 wherein said setting part is provided such that said setting part cannot be operated when said safety controller is installed in a specified manner; and wherein said setting part is operable from a back surface of a case, said safety controller being installed in said specified manner by being attached over said back surface.

19. The system of claim 13 wherein said setting part comprises a first setting part adapted to set at least a part of items to be set by said setting part and a second setting part adapted to set the same part of said items, said control part having two CPUs consisting of a first CPU and a second CPU, outputs from said first and second setting parts being respectively transmitted to said first and second CPUs, each of said CPUs serving to compare the outputs from said first and second setting parts; and wherein said second setting part is visually observable when said safety controller is installed in a specified manner.

20. The system of claim 18 wherein said setting part is provided such that said setting part cannot be operated when said safety controller is installed in said specified manner; and wherein said setting part is operable from a back surface of a case, said safety controller being installed in said specified manner by being attached over said back surface.

* * * * *